United States Patent
Herron (10) Patent No.: US 9,495,811 B2
(45) Date of Patent: Nov. 15, 2016

(54) METHOD AND SYSTEM FOR RECORDING THE USE OF WASTE DISPOSAL CONTAINERS

(71) Applicant: Neil Herron, Sunderland (GB)

(72) Inventor: Neil Herron, Sunderland (GB)

(73) Assignee: GRID SMARTER CITIES LTD, Tyne and Wear (GB)

(*) Notice: Subject to any disclaimer, the term of this patent is extended or adjusted under 35 U.S.C. 154(b) by 57 days.

(21) Appl. No.: 14/410,303

(22) PCT Filed: Jun. 28, 2013

(86) PCT No.: PCT/GB2013/051712
§ 371 (c)(1),
(2) Date: Dec. 22, 2014

(87) PCT Pub. No.: WO2014/001813
PCT Pub. Date: Jan. 3, 2014

(65) Prior Publication Data
US 2015/0339864 A1    Nov. 26, 2015

(30) Foreign Application Priority Data
Jun. 29, 2012    (GB) .................................. 1211595.2

(51) Int. Cl.
*G07C 5/00*    (2006.01)
*G01S 19/13*    (2010.01)
(Continued)

(52) U.S. Cl.
CPC ................ *G07C 5/008* (2013.01); *B09B 1/00* (2013.01); *B65F 1/1484* (2013.01); *G01S 19/13* (2013.01);
(Continued)

(58) Field of Classification Search
None
See application file for complete search history.

(56) References Cited

U.S. PATENT DOCUMENTS 5,416,706 A    5/1995    Hagenbuch
5,880,958 A *  3/1999    Helms .................... G08G 1/202
                                               340/991

(Continued)

FOREIGN PATENT DOCUMENTS

DE    10 2010 030 764 A1    1/2012
EP              1258839 A2   11/2002

OTHER PUBLICATIONS

Impinj, Inc., Monroe County Cleans Up With RFID, Impinj RFID Technology Enables Automated Waste Recovery, Copyright 2010 Impinj, Inc., pp. 1-4.
(Continued)

*Primary Examiner* — Leon-Viet Nguyen
(74) *Attorney, Agent, or Firm* — Quarles & Brody LLP (57) ABSTRACT

A method of and apparatus for creating record data for an authorizing body of, for example, skips and other waste containers is disclosed. Such a system includes receiving data from a telemetry system attached to a skip lorry. This data includes, vehicle identification data, location data identifying a location of the vehicle and loading/unloading data identifying when an object is loaded onto and/or unloaded from the vehicle. This data is then processed to determine locations where waste containers have been loaded and unloaded from vehicles and compare this to a permit booking system to ensure compliance with the booking system.

31 Claims, 3 Drawing Sheets

(51) Int. Cl.
*H04Q 9/00* (2006.01)
*B09B 1/00* (2006.01)
*B65F 1/14* (2006.01)
*G06Q 10/00* (2012.01)
*G06Q 10/08* (2012.01)

(52) U.S. Cl.
CPC .......... *G06Q 10/0833* (2013.01); *G06Q 10/30* (2013.01); *H04Q 9/00* (2013.01); *H04Q 2209/40* (2013.01); *Y02W 90/20* (2015.05)

(56) References Cited

U.S. PATENT DOCUMENTS

| | | |
|---|---|---|
| 6,611,755 B1 | 8/2003 | Coffee et al. |
| 2005/0171692 A1 | 8/2005 | Hamblen et al. |
| 2006/0178933 A1* | 8/2006 | FitzGerald ............. G06Q 20/26 705/14.35 |
| 2007/0149184 A1* | 6/2007 | Viegers ................. G06Q 10/06 455/422.1 |
| 2010/0089486 A1 | 4/2010 | Koeninger et al. |
| 2011/0300894 A1* | 12/2011 | Roberts, Sr. ............ H04W 4/00 455/521 |
| 2013/0041832 A1* | 2/2013 | Rodatos ................. G06Q 10/10 705/308 |
| 2013/0302758 A1* | 11/2013 | Wright .................. G07C 5/008 434/65 |

OTHER PUBLICATIONS

Steinwender, et al., Handbuch zur Einführung von Telematikanwendungen in der Kreislaufwirtschaft und bei Kommunaldiensten [Guide to Introduction of Telematics Applications in the Circular Economy and in Local Services], Jan. 15, 2010, pp. 1-67.

Anonymous, Container auf Straße, Parkplatz Oder Burgersteig Abstellen—Containerbestellung 24, https://web.archive.org/web/20111123032240/http://containerbestellung24.de, Nov. 23, 2011, 1 page.

Intellectual Property Office, Examination Opinion, Application No. GB1211595.2, Nov. 26, 2013, 3 pages.

PCT International Search Report and Written Opinion, PCT/GB2013/051712, May 12, 2014, 12 pages.

Motorola, "Advantages of RFID in Transportation and Logistics", Dec. 1, 2011, pp. 1-8, retrieved from the Internet: on May 18, 2015.

* cited by examiner

METHOD AND SYSTEM FOR RECORDING THE USE OF WASTE DISPOSAL CONTAINERS

CROSS-REFERENCE TO RELATED APPLICATIONS

This application represents the national stage entry of PCT International Application No. PCT/GB2013/051712 filed Jun. 28, 2013, which claims the benefit of Great Britain Patent Application 1211595.2 filed Jun. 29, 2012, both of which are hereby incorporated herein by reference for all purposes.

The present invention relates to a method and system for recording data relating to the loading and unloading of object, such as waste disposal containers, where permits are required and relates particularly, but not exclusively, to the tracking of waste vehicles and issuing of permits for the use of waste containers.

The use of waste containers, such as skips and dumpsters, is commonplace and it is equally well known to require permits to be issued for the use of such containers particularly where a skip is to be placed temporarily on a road. Many authorising bodies require the pre-booking of a skip permit and a payment, the level of which may depend upon the type of road that the skip is to be left on. At present, such booking systems require significant manual input. Furthermore checking and enforcement that skips are only parked when authorised to do so is often limited because of the labour intensive nature of the checking process. Similar problems exists for the authorisation of other objects that are put onto a highway, for example temporary traffic lights, worker's cabins and equipment storage cabins all of which of often need to be put on a road when works are being carried out on or adjacent road.

Furthermore, in the case of waste containers, such booking systems are not integrated into a waste management record systems ensuring that the waste placed into the skip goes to the correct waste disposal facility.

Preferred embodiments of the present invention seek to overcome the above described disadvantages of the prior art.

According to an aspect of the present invention, there is provided a method of creating record data for an authorising body, comprising:
receiving data from a telemetry system attached to an object transportation vehicle, the data including,
  i) vehicle identification data identifying a vehicle,
  ii) first location data identifying a location of the vehicle, and
  iii) loading/unloading data identifying when an object is loaded onto and/or unloaded from the vehicle,
processing said data to determine locations where objects have been loaded and unloaded from vehicles.

By creating record data for an authorising body using data received from a telemetry system including vehicle identification data, location data and loading and unloading data and processing this data to determine locations where objects, in particular waste containers, have been loaded and unloaded, the advantage is provided that an automatic permit and permit charging scheme can be created. This allows for a significant reduction in the manpower required to authorise such permits. Furthermore, such a system requires all waste container operator companies to use such a telemetry system providing further advantages relating to the tracking of vehicles thereby reducing the opportunities for inappropriate disposal of waste. For example, once a filled waste container has been loaded on to a vehicle and the reloading logged, the telemetry system can be used to ensure that the vehicle travels to an appropriate waste disposal or recycling centre before the container is unloaded. Where the system is being used on waste disposal containers it also makes it possible to track the use of containers at all times. For example, where a skip is used off-road a permit may not be required. As a result, it may be that some waste disposal is not correctly paid for or accounted for and waste may disposed of incorrectly. The use of this system makes sure that all skip loading and unloading operations are recorded.

The object may be a waste disposal container.

In a preferred embodiment the vehicle identification data is read from a memory comprising part of the telemetry system.

In another preferred embodiment the first location data is obtained from a satellite navigation receiver.

In a further preferred embodiment the loading/unloading data includes waste container identifier data that is read by at least one reading device adapted to read an identifier located on a waste disposal container.

By including a waste container identifier on the container, the advantage is provided that the contents of the waste container can be more easily tracked. Furthermore, for the purposes of enforcement of the permit scheme it is possible for the enforcement person checking on the skip to check that the container is the correct container and that authorisation has been given for that size of container in that location. This feature also provides the advantage that when a container without authorisation is identified, the owner of that container can be easily traced.

In a preferred embodiment, the reading device comprises an RFID reader and said identifier comprises at least one RFID tag.

By using an RFID tag and RFID reader, the advantage is provided that the loading and unloading of containers, and producing the loading/unloading data, can be automated. In particular the bringing of a tag into the proximity of the reader indicates the loading of a container on to the vehicle. Similarly, the removal of a tag from within the range of the reader indicates an unloading of the container.

In another preferred embodiment, the loading/unloading data is produced when said RFID tag and RFID reader come into and out of range of each other.

The reading device may comprise an optical data reader and said identifier comprises at least one visual data representation on said waste container.

In a preferred embodiment, the data is received from one or more of a mobile telephone data transmitter, a radio frequency data transmitter.

The method may further comprise applying charges to an operator of the vehicle in response to said received data.

The method may further comprise comparing said received data to booking data from a booking system that allows pre-booking of a permit to use a waste disposal container.

The method may further comprise receiving on-road/off-road data indicating whether the waste container is parked on a road or not.

According to another aspect of the present invention, there is provided a method of enforcement of permits, comprising determining a location of an object to produce second location data and comparing said second location data with at least said first location data gathered according to the method set out above, to determine whether said waste container has had the correct permit issued.

According to a further aspect of the present invention, there is provided a method of creating data for a record system of an authorising body, comprising:
using a telemetry system attached to an object transportation vehicle, producing data including,
  i) vehicle identification data identifying a vehicle,
  ii) first location data identifying a location of the vehicle, and
  iii) loading/unloading data identifying when an object is loaded onto and/or unloaded from the vehicle; and
transferring said data to a data processing system to determine locations where objects have been loaded and unloaded from vehicles.

In a preferred embodiment, the vehicle identification data is read from a memory comprising part of the telemetry system.

In another preferred embodiment, the first location data is obtained from a satellite navigation receiver.

In a further preferred embodiment, the loading/unloading data includes waste container identifier data that is read by at least one reading device adapted to read an identifier located on a waste disposal container.

The reading device may comprise an RFID reader and said identifier comprises at least one RFID tag.

In a preferred embodiment, the loading/unloading data is produced when said RFID tag and RFID reader come into and out of range of each other.

In another preferred embodiment, the reading device comprises an optical data reader and said identifier comprises at least one visual data representation on said waste container.

The data may be transmitted by one or more of a mobile telephone data transmitter, a radio frequency data transmitter.

The method may further comprise creating on-road/off-road data indicating whether the waste container is parked on a road or not.

According to another aspect of the present invention, there is provided a telemetry system attached to an object transportation vehicle for use in providing data to a record system for an authorising body, the telemetry system comprising:
i) vehicle identification means for producing vehicle identification data identifying a vehicle;
ii) location determining means producing first location data identifying a location of the vehicle;
iii) loading operation identifying means for producing loading/unloading data identifying when an object is loaded onto and/or unloaded from the vehicle; and
iv) data transfer means for transferring said data.

In another preferred embodiment, the vehicle identification means comprises vehicle identification data stored on a memory device forming part of the telemetry system.

In another preferred embodiment, the location determining means comprises a satellite navigation receiver.

In a further preferred embodiment, the loading operation identifying means comprises at least one reading device adapted to read an identifier located on a waste disposal container.

The reading device may comprise one or more of an RFID reader, an optical data reader, a barcode reader and a QR code reader.

The data transmitter means may further comprise one or more of a mobile telephone data transmitter, a radio frequency data transmitter.

The system may further comprise means fourth data indicating whether the container is parked on a road or not.

According to a further aspect of the present invention, there is provided a record system for a waste disposal container authorising body, the system comprising:
a telemetry system as set out above; and
a data processing system for receiving said vehicle identification, first location and loading/unloading data and determining locations where waste containers have been loaded and unloaded from vehicles.

In a preferred embodiment, the data processing system further comprises at least one charging system for applying charges to an operator of the vehicle in response to said vehicle identification, first location and loading/unloading data.

In another preferred embodiment, the data processing system compares said vehicle identification, first location and loading/unloading data to booking data from a booking system that allows pre-booking of a permit to use a waste disposal container.

Preferred embodiments of the present invention will now by described by way of example only, and not in any limitative sense, with reference to the accompanying drawings in which.

Figure 1:
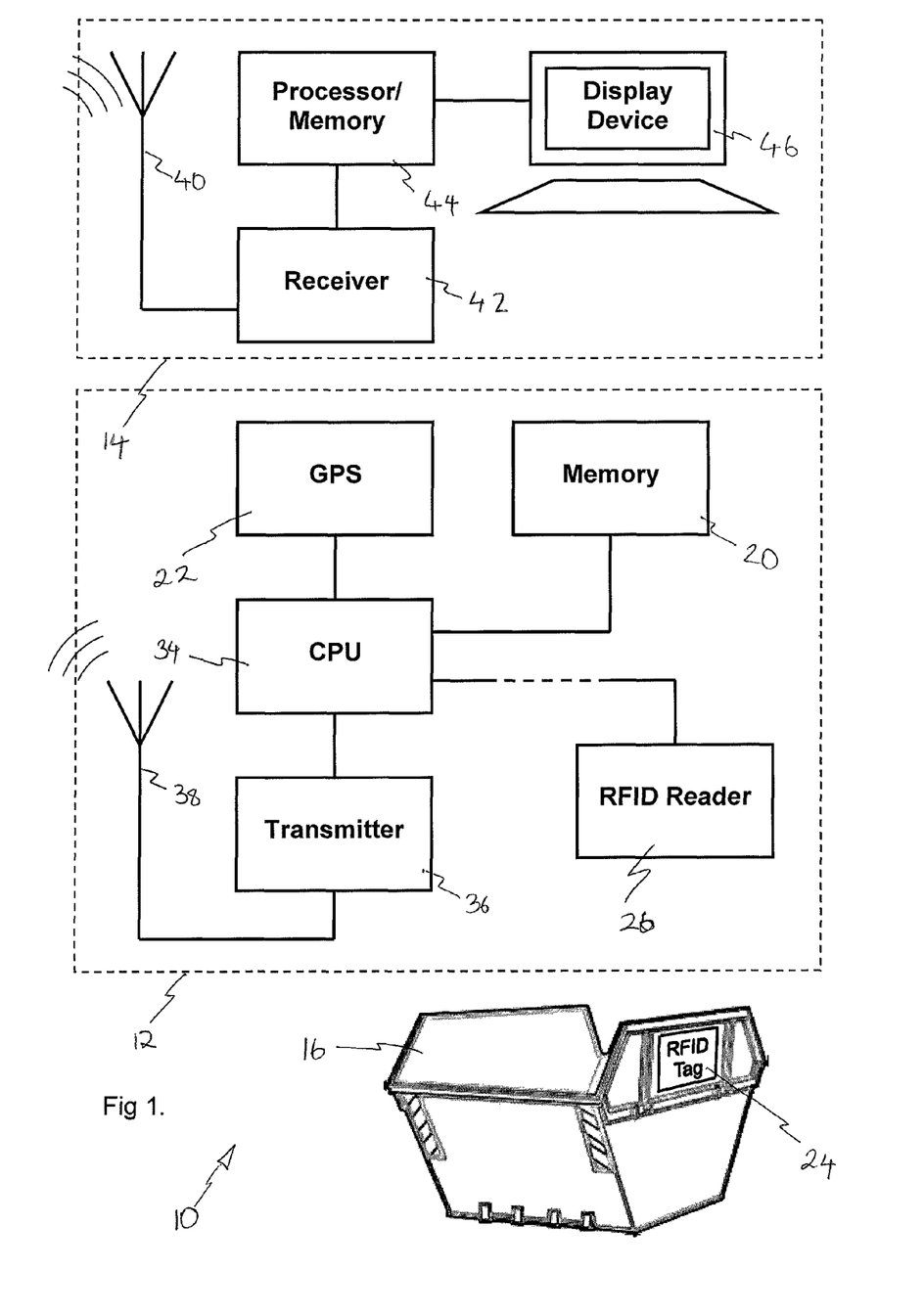
FIG. 1 is a schematic representation of the apparatus of the present invention.

Referring to FIG. 1, a record system 10 for a waste disposal container authorising body includes a telemetry system 12 and a data processing system 14. The processing system 14 is typically run by or on behalf of the waste disposal container authorising body, herein after referred to as "the authority". Such bodies are often government based, local government based or government authorised organisations who authorise the use of waste disposal containers including for example a skip 16 or similar large containers, including dumpsters and the like, that require a license to be issued for their use. This license may be for any use of any object, such as skip 16, in any location or may be a license that is only required when the skip is used in certain locations, for example, where the skip must be placed on a public highway. Examples of other objects that may require such permits or authorisations include traffic lights used for road works, workers cabins that may need to be placed on a highway, equipment storage cabins and other similar objects. In each of these cases the object causes a temporary obstruction on a highway and therefore may require a permit. The example set out below focuses primarily on waste containers such as skip but many of the same principles and advantages apply to other objects.

The telemetry system 12 is typically attached to a waste container transportation vehicle or skip lorry 18, and includes a vehicle identification means (typically the Vehicle Registration Number) for producing vehicle identification data that identifies the skip lorry 18. The vehicle identification means is most typically a portion of a memory 20 that stores the vehicle identification data for the vehicle 18 that the telemetry system 12 is located on. However, where a telemetry system may be moved from one vehicle to another, other means for identifying the vehicle may be included. These include a bar code reader or the like that reads a bar code that identifies and is attached to the vehicle.

The telemetry system 12 also includes a location determining means for producing first location data identifying the location of the vehicle 18. This location determining means is typically a satellite navigation receiver 22 which can use any suitable satellite navigation system including global positioning systems and the like.

The telemetry system 12 also has a loading operation identifying means for producing loading and unloading data identifying when a skip 16 is loaded onto and/or unloaded from the skip lorry 18. Various means for producing the loading/unloading data are available and the following example uses an RFID tag 24, located on skip 16 and an RFID reader 26 forming part of the telemetry system 12 and located on skip lorry 18. The use of a dotted line to connect the reader to the rest of the telemetry system indicates that the reader may be located separately from the rest of the components of the telemetry system. The location of the RFID tag 24 on the side of skip 16 is merely illustrative and the tag 24 may be located anywhere on skip 16 so that the tag can be read by the reader 26 when the skip is loaded onto the lorry 18. For example, a pair of tags 24 may be attached to the front and rear panels 28 and 30 of skip 16 and the reader 26 located just behind the cab 32 of lorry 18. As a result, when a skip 16 is loaded onto lorry 18, one of the tags 24 will be sufficiently close to the reader 26 to be read thereby identifying the skip as being loaded onto lorry 18. Thus when a tag 24 moves from being readable by reader 26 to no longer being readable by reader 26, this indicates an unloading of the skip 16. When a tag 24 becomes readable by reader 26 this indicates the loading of a skip 16 onto lorry 18.

The vehicle identification data, location data and loading/unloading data are all processed by a processor 34 and transferred from the telemetry system 12 to the processing system 14. In the example shown, this transfer is achieved by a transmitter 36 transmitting the data via a transmitting aerial 38 to a receiving aerial 40 and on to a receiver 42 that forms part of the processing system 14. The transmittal of data can be continuous or periodic. For example, data can be only transmitted after completion of a loading/unloading of a skip or data may be transmitted on an hourly or daily basis. Furthermore, other data transfer methods may be used including the transfer of data from the telemetry system to a computer operated by the company operating the skip lorry before data is parcelled together with other data from other lorries and transferred via the Internet to the processing system 14. The transmitter 36 and receiver 42 can be any suitable for transmitting and receiving data including mobile telephone data transmitters and radio frequency data transmitters.

Data received by receiver 42 is transferred to a processor/memory system 44 that processes the data and processed data is typically displayed on a display device 46 which may be a standard computer.

Figure 2:
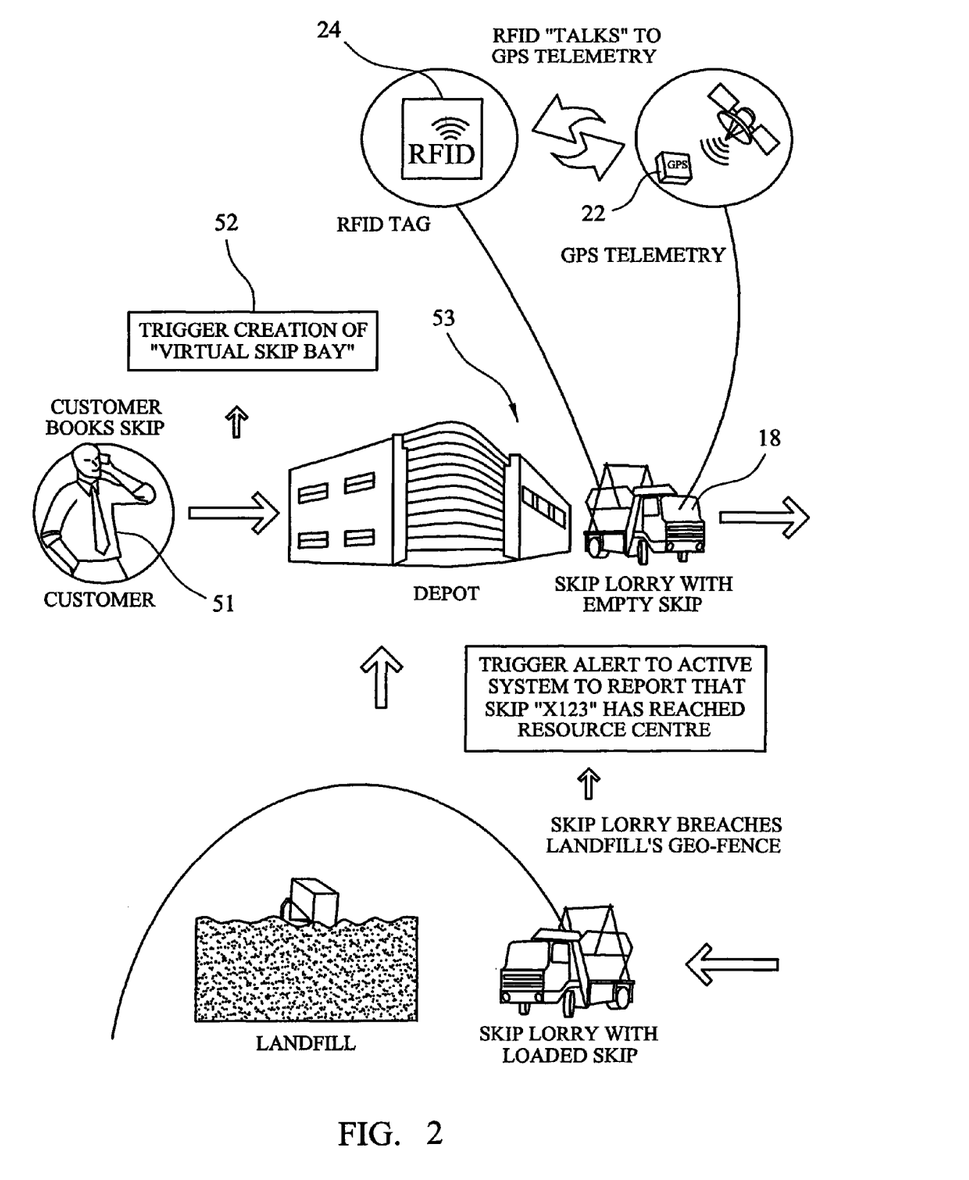
FIGS. 2 and 2A are a schematic representation of the method of the present invention.
Figure 2A:
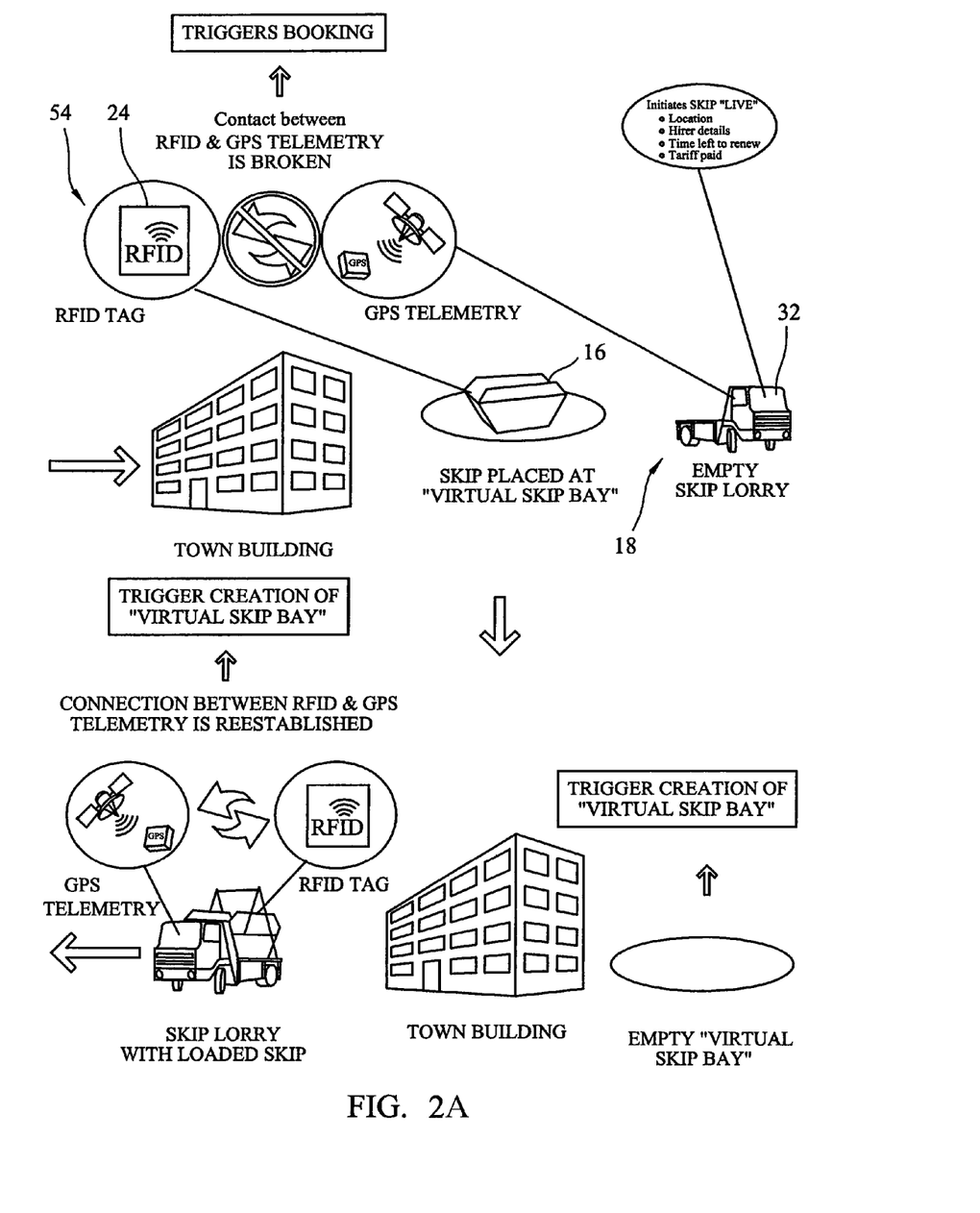

Use of the record system will now be described with additional reference to FIGS. 2 and 2A.

A customer of a skip hire company contacts the skip hire company and books a skip to be delivered a specified location from a certain start time and for a specified period of time (step S1). As a result of this booking, the skip hire company lodges a request for a permit with the authority and a permit is issued. The permit allows the skip hire company to place a skip in the location for the period of time starting from the specified time. This permission can be regarded as a "virtual skip bay" (see step S2), which is a permission to locate an object on a highway that would otherwise not be allowed to be located in that position. In a simple example, the skip hire company may wish to use a city centre on-road parking bay to locate its skip. However, the preferred, and allowed, location for the skip may be at a location where the stopping and parking of vehicles is not allowed. The virtual skip bay is a temporary authorisation.

Shortly before the delivery time for the skip, at the skip hire company's depot, a skip is loaded onto the skip lorry (step S3). By loading the skip onto the lorry, the RFID tag 24 comes into close proximity with the reader 26 thereby indicating that a skip has been loaded onto the lorry. The satellite navigation receiver 22 on skip lorry 18 receives satellite navigation signals and calculates the location of the skip lorry 18. Since the skip lorry 18 is at the skip hire company depot, it is clear that an empty skip has been loaded onto the lorry for delivery to the location.

The skip lorry 18 then travels to the location requested by the customer and at step S4 the skip 16 is unloaded from the lorry 18. Because the RFID tag 24 goes out of range of the reader 26 it is clear that the empty skip has been unloaded. The satellite navigation receiver calculates the location of the lorry and this data is sent by transmitter 36 to receiver 42. On receiving the data (which includes the vehicle identification data, the location data and the unloading data), the processor 44 compares the data to the booking data to determine whether the skip has been unloaded into an authorised location according to the current permits. In other words, the booking system is checked to determine that the skip has been put into a virtual skip bay. If a match is found, the booking is confirmed and an applicable charge is made by the authority to the skip hire company. However, if a match is not found then further action may be taken by the authority. This may include issuing a penalty charge to the skip hire company or making further investigations.

After a period of time, the skip is due for collection by the skip hire company. This may either be in response to contact being made by the customer or the skip may be automatically retrieved at the end of the permit time. As a result, an empty skip lorry returns to the location, with the telemetry system 14 aware that no skip is present on the vehicle since there is no RFID tag within range of the reader. When the filled skip is loaded back onto the vehicle, an RFID tag comes into range of the reader and the loading operation is recorded. The sat nav receiver in the telemetry system records the location and the vehicle identification data, location data and loading data is transmitted to the processing system indicating that a filled skip has been loaded onto the lorry.

The processing system can check this data against the booking data and if the pick up of the skip is within the time period specified within the permit, no further action need be taken by the authority. However, if the loading of the filled skip is outside the permit period, further action may be taken by the authority.

Once a filled skip has been loaded onto the lorry, the lorry will typically be travelling to a location where the skip can be emptied. This will either be a landfill site or a waste sorting/recycling centre that is perhaps operated by the skip hire company. As a result, the vehicle can be tracked to ensure that the skip is unloaded at a suitable site. For example, it is unlikely that there is any need to unload a filled skip at any other location. As a result, the vehicle can be tracked to ensure that the next unloading operation only takes place within a geofence surrounding a landfill or other suitable site.

The present invention also makes the process of permit enforcement easier than is seen in the prior art. For example, a Civil Enforcement Officer, normally responsible for handling matters including ensuring that vehicles are legally parked on the highway, can incorporate the monitoring of skip locations easily into their responsibilities. Many Civil Enforcement Officers use an electronic ticket issuing device that includes a satellite navigation receiver and which does or could include an RFID tag reader, as well as ones which are not correctly illuminated or coned. As a result, when a Civil Enforcement Officer sees a skip located on a road, they can use their electronic device to firstly send a query to the booking database to determine whether a permit has been issued for a skip at their present location. If the location is within a virtual skip bay with a correctly issued permit then no further action need be taken. Checking the RFID tag can also be used to ensure that the correct skip is located in the correct location. For example, higher charges may be applied where larger skips are used and the tag can be read and this data incorporated into the query to ensure that the correct size of skip is permitted by the permit. If the Civil Enforcement Officer finds a skip on which a permit has not been issued, or on which an RFID tag is not present, then further investigation can be undertaken.

It will be appreciated by persons skilled in the art that the above embodiments have been described by way of example only and not in any limitative sense, and that the various alterations and modifications are possible without departure from the scope of the invention as defined by the appended claims. For example, the pre-booking set out in connection with the method disclosed in FIGS. 2 and 2A could be eliminated in the present invention. When a customer requests a skip, the skip hire company can simply deposit the skip in the requested location. The unloading of the skip will cause the transmittal of location data and vehicle identification data and perhaps data relating to the size of the skip to the processing system. This automatically starts a charging process where the skip hire company will be charged depending upon the location that the skip has been left with some locations attracting a higher tariff than others. The charge may also be dependent upon the size of skip that has been unloaded. When the lorry returns to collect the full skip and it is reloaded onto the vehicle, this ends the time at which the skip was present at the location and a charge is made to the skip hire company depending upon the factors already mentioned and the period of time that the skip was present at that location. Similarly, when a Civil Enforcement Officer is checking a skip, it is simple to read the RFID tag and check that the skip in question has been correctly registered as being unloaded at that location and that the appropriate charge is being made.

Other methods of identifying the loading and unloading of skips can include meters that identify the use of the skip loading and unloading arm and may further include strain meters that can determine whether a full or empty skip is being loaded or unloaded or whether the arm is being operated with no skip attached. Similarly other skip identifiers can be used including optical data readers that read barcodes or QR codes. These can either be read by a reader on the arm of the skip lorry as the skip is loaded and unloaded. In a further alternative, the optical data could be located on an end of the skip and a reader located adjacent the skip lorry cab 32 so that the optical data can be read regularly when the skip is located on the lorry and the unloading operation is marked by the removal of the optical data from the reader. Similarly, the loading of the skip is marked by the successful reading of an optical data code.

For some authorities, a different charge, or no charge at all, is made where a skip is located off the public highway on private property. The system of the present invention is able to provide that data either by a manual indication where data is input to the telemetry system indicating that the skip has been placed off-road. Alternatively, and where satellite navigation data is sufficiently accurate, a geofence can be placed around the road system and where the telemetry system's satellite navigation receiver breaks that geofence to be on private property then this is indicated in the data sent to the processing system. It is noted that the location of the skip can be calculated either by the telemetry system prior to data transmittal or by the processing system after receiving the data to take account for the skip being located a short distance behind the vehicle during the unloading operation. The direction that the vehicle is pointing can be calculated based on the GPS data and last movements of the vehicle prior to stopping and the loading or unloading operation taking place.

The invention claimed is:

1. A method of creating record data for an authorising body, comprising:
   receiving data from a telemetry system attached to a waste disposal container transportation vehicle,
   wherein said telemetry system comprises at least one reading device adapted to read an identifier located on a waste disposal container transported by the vehicle,
   wherein said data includes:
      i) vehicle identification data identifying the vehicle,
      ii) first location data identifying a location of the vehicle, and
      iii) loading data and unloading data identifying when a waste disposal container is loaded onto the vehicle and unloaded from the vehicle respectively, wherein said loading data is produced when said reading device and an identifier located on said waste disposal container come into range of each other, and said unloading data is produced when said reading device and an identifier located on said waste disposal container come out of range of each other;
   wherein said method further includes processing said data to determine locations where waste disposal containers have been loaded and unloaded from vehicles.

2. A method according to claim 1 wherein said vehicle identification data is read from a memory comprising part of the telemetry system.

3. A method according to claim 1 wherein said first location data is obtained from a satellite navigation receiver.

4. A method according to claim 1 wherein said loading/unloading data includes waste disposal container identifier data that is read by said reading device from said identifier located on said waste disposal container.

5. A method according to claim 4 wherein said reading device comprises an RFID reader and said identifier comprises at least one RFID tag.

6. A method according to claim 5 wherein said loading data and said unloading data are produced when said RFID tag and RFID reader come into and out of range of each other respectively.

7. A method according to claim 4 wherein said reading device comprises an optical data reader and said identifier comprises at least one visual data representation on said waste disposal container.

8. A method according to claim 1 wherein said data is received from one or more of a mobile telephone data transmitter, a radio frequency data transmitter.

9. A method according to claim 1 further comprising applying charges to an operator of the vehicle in response to said received data.

10. A method according to claim 1 further comprising comparing said received data to booking data from a booking system that allows pre-booking of a permit to use a waste disposal container.

11. A method according to claim 1 further comprising receiving on-road/off-road data indicating whether the waste disposal container is located on a road or not.

12. A method of enforcement of permits, comprising determining a location of a waste disposal container to produce second location data and comparing said second location data with at least said first location data gathered according to the method of claim 1 to determine whether said waste disposal container has had the correct permit issued.

13. A method of creating data for a record system of an authorising body, comprising:—
producing data using a telemetry system attached to a waste disposal container transportation vehicle;
wherein the telemetry system comprises at least one reading device adapted to read an identifier located on a waste disposal container transported by the vehicle;
wherein the data includes:
  i) vehicle identification data identifying the vehicle,
  ii) first location data identifying a location of the vehicle, and
  iii) loading data and unloading data identifying when a waste disposal container is loaded onto the vehicle and unloaded from the vehicle respectively, wherein said loading data is produced when said reading device and an identifier located on said waste disposal container come into range of each other, and said unloading data is produced when said reading device and an identifier located on said waste disposal container conic out of range of each other; and
said method further includes transferring said data to a data processing system to determine locations where waste disposal containers have been loaded and unloaded from vehicles.

14. A method according to claim 13 wherein said vehicle identification data is read from a memory comprising part of the telemetry system.

15. A method according to claim 13 wherein said first location data is obtained from a satellite navigation receiver.

16. A method according to claim 13 wherein said loading/unloading data includes waste disposal container identifier data that is read by said reading device from said identifier located on said waste disposal container.

17. A method according to claim 16 wherein said reading device comprises an RFID reader and said identifier comprises at least one RFID tag.

18. A method according to claim 17 wherein said loading data and said unloading data are produced when said RFID tag and RFID reader come into and out of range of each other respectively.

19. A method according to claim 16 wherein said reading device comprises an optical data reader and said identifier comprises at least one visual data representation on said waste disposal container.

20. A method according to claim 13 wherein said data is transmitted by one or more of a mobile telephone data transmitter, a radio frequency data transmitter.

21. A method according to claim 13 further comprising creating on-road/off-road data indicating whether the waste disposal container is parked on a road or not.

22. A telemetry system attached to a waste disposal container transportation vehicle for use in providing data to a record system for an authorising body, the telemetry system comprising:
  i) a vehicle identification part for producing vehicle identification data identifying a vehicle;
  ii) a location determining part producing first location data identifying a location of the vehicle;
  iii) at least one reading device adapted to read an identifier located on a waste disposal container transported by the vehicle;
  iv) a loading operation identifying part for producing loading data and unloading data identifying when the waste disposal container is loaded onto the vehicle and unloaded from the vehicle respectively, wherein said loading data is produced when said reading device and said identifier located on said waste disposal container come into range of each other, and said unloading data is produced when said reading device and said identifier located on said waste disposal container come out of range of each other; and
  v) data transfer means for transferring said data.

23. A system according to claim 22 wherein said vehicle identification part comprises vehicle identification data stored on a memory device forming part of the telemetry system.

24. A system according to claim 22 wherein said location determining part comprises a satellite navigation receiver.

25. A system according to claim 22 wherein said reading device comprises one or more of an RFID reader, an optical data reader, a barcode reader and a QR code reader.

26. A system according to claim 22 wherein said data transfer means comprises one or more of a mobile telephone data transmitter, a radio frequency data transmitter.

27. A system according to claim 22 further comprising a location indicating part for producing on-road/off-road data indicating whether the waste disposal container is parked on a road or not.

28. A record system for an authorising body, the record system comprising:—
  a telemetry system according to claim 22; and
  a data processing system for receiving said vehicle identification data, said first location data, said loading data and said unloading data, and determining locations where waste disposal containers have been loaded and unloaded from vehicles.

29. A system according to claim 28 wherein said data processing system further comprises at least one charging system for applying charges to an operator of the vehicle in response to said vehicle identification, first location and loading/unloading data.

30. A system according to claim 28 wherein said data processing system compares said vehicle identification, first location and loading/unloading data to booking data from a booking system that allows pre-booking of a permit to use said waste disposal container.

31. A system according to claim 22, wherein said reading device comprises an RFID reader and said identifier comprises at least one RFID tag, and wherein said loading data and said unloading data are produced when said RFID tag and said RFID reader come into and out of range of each other respectively.

* * * * *

UNITED STATES PATENT AND TRADEMARK OFFICE
CERTIFICATE OF CORRECTION

PATENT NO.        : 9,495,811 B2
APPLICATION NO.   : 14/410303
DATED             : November 15, 2016
INVENTOR(S)       : Neil Herron Page 1 of 1

It is certified that error appears in the above-identified patent and that said Letters Patent is hereby corrected as shown below:

In the Claims

Claim 13, Column 9, Line 31, change "conic" to --come--.

Signed and Sealed this
Fourth Day of April, 2017

Michelle K. Lee
*Director of the United States Patent and Trademark Office*